Figure 1:
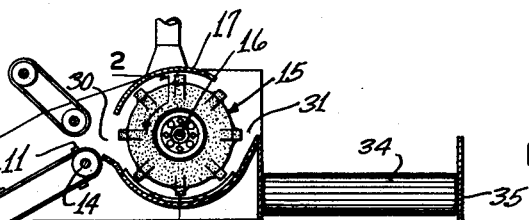

Dec. 9, 1941.  H. MAGINN  2,265,380

THRESHING CYLINDER ASSEMBLY

Filed March 1, 1939

INVENTOR
HAROLD MAGINN
BY *Robert B. Terry*
ATTORNEY

Patented Dec. 9, 1941

2,265,380

UNITED STATES PATENT OFFICE 2,265,380

THRESHING CYLINDER ASSEMBLY

Harold Maginn, Waverly, Ill.

Application March 1, 1939, Serial No. 259,089

22 Claims. (Cl. 130—27)

This invention relates to improvements in threshing cylinder assemblies, and more particularly to an improved cylinder of built-up type, for use in separators, as well as an improved combination of such cylinder with casing and concave elements particularly adapted therefor.

Certain attempts have heretofore been made to provide, for the threshing or shelling of grain and like crops, resilient cylinder or concave elements for the purpose of minimizing impact damage, particularly to beans, peas and the like, but also in attempted minimization of damage incident to the threshing of the usual field grains and grass seeed crops. Such former attempts have, however, failed of full success because of chipping or spalling effects on the rubber stocks heretofore employed in or as parts of the grain threshing elements. A further noteworthy commercial difficulty has heretofore existed in connection with attempts to construct separator cylinders of rubber or the like, due to the required size and hence the high costs of molding equipment for producing rubber elements of a length corresponding to that of the usual grain separator cylinders which are at least several feet in length. Still other attempts to meet the noted difficulties have been made by facing either or both the separator and concave bars, or corresponding elements, with rubber stocks. The time and expense of renewal of such rubber facing strips or elements is, however, such as to be deterrent to the general adoption of this solution of the problem. It will further appear that metal-backed rubber elements attempted to be used in this connection are, because of the relative rigidity of the metal, yieldable or resilient only to a very limited degree. The present invention accordingly has as a major object, the solution of each and all of the heretofore prevailing difficulties, by the provision of a cylinder construction for separators, which may be built up by any one without the requirement of special tools or skill, of units of reduced size, which may be individually molded at a greatly reduced production cost in comparison with the molding expense of rubber separator elements of a length corresponding to that of any of the prevailing separator or combine cylinders.

Yet another object of the invention is attained in an improved arrangement of units in a built up bar-type separator cylinder, such that any of the units may be serviced or repaired independently of the others, and further such that the units may be replaced individually or as a whole, according to desire.

Yet another object of the invention is attained in a construction of the unit to be used in pluralities in threaded relation on a shaft therefor, so that the units collectively constitute a bar-type threshing cylinder which is of simplified construction, and which possesses the advantage in operation of greatly reducing, in fact obviating practically altogether, the impact damage to the threshed grain or seed which sometimes results from the use of metal, or metal-backed threshing elements.

More specifically expressed in reference to the presently preferred embodiments of the invention, it involves the construction of a grain separator cylinder or the like, of a plurality of shaft-mounted wheel-like units, each of which is of pneumatic type, independently inflatable, and which are so constructed that when aligned in assembly on the shaft, the units coact to form an improved bar-type separator cylinder.

A still further object of the invention is attained in an assembly which preferably includes a cylinder of the general type referred to in the preceding objects, and which further includes an open-side cylinder casing, and a novel combination including with the cylinder, an arrangement of concave bars which coact with the threshing portions of the cylinder in quickly and efficiently processing the grain or other seed crops, while avoiding practically altogether any impact damage to the threshed grain, seed or the like.

Figure 2:
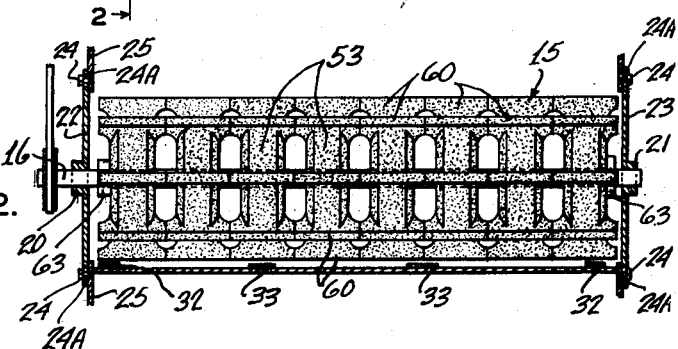
Figure 3:
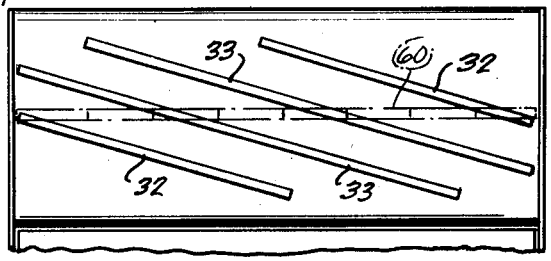
Figure 4:
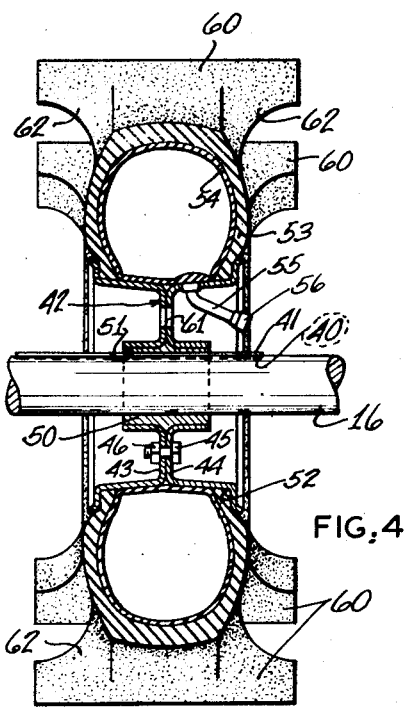
Figure 5:
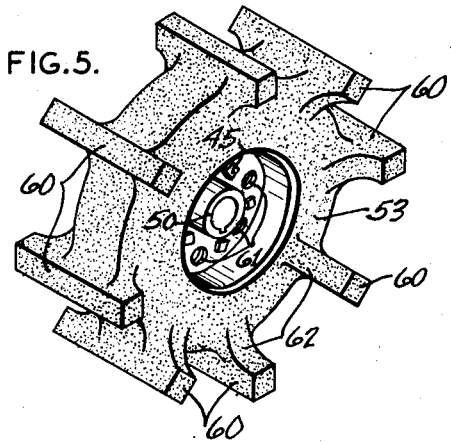

The foregoing and numerous other objects will be more readily apparent as the description proceeds, particularly when considered in connection with the accompanying drawing, in which:

Fig. 1 is an elevation, partly in section, taken in a plane transverse to the cylindner axis and showing a preferred general arrangement of the assembly; Fig. 2 is a vertical, longitudinal, sectional elevation as taken along line 2—2 of Fig. 1, and showing the cylinder elements in elevation as they would appear when operatively arranged in the cylinder casing; Fig. 3 is a plan view of the lower portion of the casing, particularly the concave structure thereof, and showing a preferred arrangement and location of concave bars; Fig. 4 is a sectional elevation taken diametrally of one of the wheel-like units of which the separator cylinder of Fig. 2 is built up, and Fig. 5 is an elevation in perspective of one of the units shown by Fig. 4.

Referring now by characters of reference to the drawing, the present invention may conveniently be structurally embodied in any of several known types of separating or threshing equipment, but is shown substantially as it appears when embodied in current models of a widely sold make of combine. In the embodiment illustrated, provision for feeding the pre-threshed grain, grass or other crop susceptible of being processed by a bar type cylinder, includes a draper 10 which is provided with cross bars 11, the bars being secured to a flexible fabric, or fabric and rubber apron 12. The apron operates over a pair of draper rolls, one of which is shown at 13, and its companion at 14. Both of the rolls may be power-driven, or in the event only one thereof is so actuated, its companion may serve as an idler roll for maintaining the draper apron in suitable position and under a desirable tension. For completeness, although not shown, it may be indicated that a sickle is usually located ahead of the roll 13 in case the improvements are embodied in a combine or the like, utilized for cutting as well as threshing grain in the field.

The cylinder is indicated generally at 15 (Fig. 1) and is revolvably mounted as through a shaft 16 in the cylinder casing 17. Bearings for the shaft are shown in a simplified sleeve form at 20 and 21 (Fig. 2), these being carried respectively by end plates 22 and 23. These end plates or bearing arms are by preference, secured as by cap screws 24 threadedly engaging frame elements 25. It is a great preference that the screws 24 extend through slotted openings 24A, which are for example, of a radial trend, and formed in the bearing arms or end plates 22 and 23; in any event an opening is preferably provided for each of these screws 24 somewhat larger than the screw diameter so as to permit an adjustment of the bearing arms, and hence of the shaft 16, together with the cylinder, in a direction toward and away from the concave structure, the latter being located in the lower portion of the casing and hereinafter described in more detail.

It is greatly preferred that the casing 17 be of side-open type, provided with opposed longitudinal openings, each of a length corresponding at least to that of the cylinder. The inlet opening for pre-threshed materials is shown at 30 (Fig. 1), and with the cylinder rotating in the direction of the arrow the threshed materials are moved outwardly of the casing through an exit port or opening 31, thence onto the separating rear assembly, hereinafter referred to.

The breast or concave portion of the cylinder casing 17 is best shown in plan view by Fig. 3, and includes, substantially over the length of the cylinder, a portion of an angular extent, for example, of 150 degrees of the full cylinder, the concave zone being located below the inlet and discharge openings 30 and 31. The concave is preferably formed of a relatively heavy gauge sheet material, and may consist of a single sheet or of a plurality thereof suitably assembled, and to which the concave bars are secured as by bolts (not shown). The bars (Fig. 3) are indicated at 32, these being the outside or end bars of the assembly, and somewhat shorter than the intermediate or longer bars 33. All of the bars are preferably of a rectangular section as best shown by Fig. 2, and may be either of metallic construction, or, if desired, of a resilient material such as a rubber stock.

Referring now to the separating rear assembly which serves to receive the grain as well as the stalk portions or other waste material, the threshed materials are thrown by the rotation of the cylinder over onto the straw rack indicated generally at 34, for which is provided a suitable frame structure 35. Inasmuch as the structural novelty of the present invention is confined to the cylinder, cylinder casing and immediate appurtenant parts, and since the separating rear assembly may be of conventional or any other suitable form, no detailed description thereof is regarded as necessary. However, in an embodiment utilized for a variety of grain and seed crops, it may be briefly noted that the separating rear includes a slat-type conveyor to carry the straw or other material to a zone of deposit, and further includes suitable conveyor-actuating means, as well as a fan, and a separating rack which is preferably of vibrating type but devoid of beaters, rakes, pickers, etc. Since the elements described are or may be of well known construction, it is sufficient to note without illustration, that the separated grain falls through the rack under the influence of vibration of the rack, and is deposited, say in a zone forwardly of the fan or blower, whence it is carried to suitable shaker screens, thence deposited in a grain conveyor which in turn carries the grain or seed to the bag spout or other suitable place of deposit.

Referring now more particularly to the features of construction of the cylinder per se, it is greatly preferred that the cylinder be built up of a plurality of laterally adjacent units, each of which takes the general form of a wheel or disc-like structure, the units being secured against angular displacement relative to each other or to the shaft on which they are mounted. This provision includes a suitable keyway 40 formed over the major portion of the length of the shaft 16; the keyway 40 serves to receive a key 41 which in the form of the single element illustrated, serves to lock all of the assembled units to the common shaft, but which if desired, may be comprised of a plurality of individual keys each serving the particular disc or wheel structure immediately associated therewith.

A hub and wheel portion as generally indicated at 42, consists of a pair of pressed metal hub and tread-forming structures located back to back, and particularly designated at 43 and 44, these parts being secured in assembled relation as through a plurality of bolts 45 and companion nuts 46. Parts 43 and 44 are so formed that they coact in assembly to provide a hub 50 slotted at 51 to receive and engage the key 41. The elements further coact to provide a distinct channel or tread portion 52 which serves demountably or detachably to receive a tire-like body 53 of the unit.

Although the body 53 may be of solid or semi-solid construction, it is preferred to provide for increased resilience thereof after the manner of a pneumatic tire, suitable means for inflation being shown as including an inner tube 54, a valve extension 55 carrying a valve (not shown) and provided with a cap 56. As thus far described, it will appear that the body 53 with tube 54 and the manner of its mounting on the wheel 42, are closely akin to the arrangement prevailing in the case of certain types of industrial pneumatic vehicle tires. It thus appears that each of the units includes a substantially toroidal body, or one in the form of an annulus, and which is both depthwise and angularly resilient. It is a preference to utilize in the construction of the tire-like body 53 of each of the units, a compounded and vulcanized stock which is or may be the same as any of the well known side wall and tread stocks prevalently employed in the automotive casings of vehicles. Such stocks possess the desirable characteristics of toughness, resistance to aging and freedom from an undesirable degree of distortion under stress of high speed operation. It is noted as preferable that the body 53 or casing should include the usual cord or fabric elements characterizing well known tire constructions, and are thus rendered highly resistant to any unusual impact effects which might be imposed thereon due to the presence of stones or other foreign bodies which occasionally find their way into the cylinder and housing via the draper.

In the arrangement noted it will have appeared that the peripheral portions of the bodies 53 in assembly constitute the threshing elements of the cylinder. These portions accordingly are preferably formed of the tough tread stock hereinabove referred to, and are suitably shaped to provide grain-engaging portions coacting with the concave or breast structure of the associated casing.

In the example currently disclosed, the peripheral formation of each of the bodies 53 of the several units, consists in a plurality (shown as eight) of radially projecting, somewhat T-shaped projections 60, evenly angularly spaced about the periphery of the body 53, preferably formed integrally therewith and vulcanized of the same stock as what may be considered the tread portion of the body. As will appear, the projections 60 constitute the threshing bars or beater elements of the cylinder, coacting with the concave structure in assembly. Obviously a greater or less number of the projections may be formed on each of the unit bodies 53, and their configuration may be changed according to the particular material to be processed. However, as preferred for most grains, grasses and seed crops, the projections 60 are characterized by a substantially bar form, resulting from their rectangular section either in a plane along the axis of rotation or in a plane transverse thereto. Each of the projections 60 is preferably of a width, or dimension along the axis of rotation, appreciably in excess of the small diameter of the body 53. It results from this construction that the lugs, bars or projections 60, when the units are assembled with the bars or lugs in alignment or in substantially end-to-end relation, the laterally adjacent units are appreciably spaced from each other, thus permitting a desirable free circulation of air into and out of the space or spaces inwardly of the periphery of the cylinder. To the end of facilitating this circulation through the several units, the wheel portions 42 thereof are each provided with a plurality of openings 61 (best shown by Fig. 5). It will appear that the overhanging end portions of the bars or lugs 60 will operate, when the cylinder is rotated at high speed, for example 800–1600 R. P. M., as centrifugal elements tending to cause a flow of air outwardly of the bar type cylinder resulting from the assembled units.

It has been determined that the design and arrangement of the projections or lugs shown by the drawing, conduce to strength of securement and a minimized tendency thereof to shear or tear away from the tread portion of the tire body 53, the feature of construction particularly preferred, being the truss arrangement exemplified by the portion 62, best appearing in Fig. 4. The rubber stock beneath the bar portion proper is arched upwardly or outwardly from each side wall of the body 53 of the unit, so that these wing or truss portions 62 serve materially to brace and strengthen the bar-forming portions of the lugs 60 throughout their length.

It is preferred in assembling the individual wheel units on the shaft, to provide an abutment or collar such as 63, against which a first such unit to be applied is brought to rest, and the others in succession stacked in turn so that all thereof are in threaded relation to the shaft, with the corresponding lugs, arms or bar portions 60 substantially in end-to-end relation, as is best shown by Fig. 2. The threaded relation of the units as herein described, has reference to the stacked disposition of the units, with the shaft extending through the hub apertures of the units, thus not necessarily implying a screw-threaded relation of the units and shaft. With all of the several units thus attached to the shaft, a second shaft collar 63 serves as a companion abutment to obviate any tendency to endwise displacement of any of the units. It is further preferred that the tire-like body 53 and the wheel or hub portion 42 of each unit be match-marked, so that in assembly any given one of the lugs or arms 60 is disposed in definite angular relation to the keyway 40 and key 41 of the shaft, from which it follows that all of the corresponding lugs are in alignment in final assembly.

It is a preferred practice to inflate the several bodies 53 of the units to a relatively low pressure, say of the order of twenty pounds, whereby the units exhibit a substantially resilience and are relatively easily deformable so as to clear or pass any foreign objects of substantial size which may find their way into the casing.

It will have appeared from the foregoing description that the arrangement described, enables the construction of a cylinder of any standard or suitable length, by utilizing an appropriate number of the units from which the cylinder is built up; that the cylinder construction as described offers all of the many advantages of a high-speed, bar-type cylinder in the threshing of grain, seed, grass crops and the like, and at the same time provides a long-like resilient separator agency which serves greatly to reduce, in fact practically obviate altogether, the former considerable impact damage to grain and seed by reason of the use solely of metal parts as the threshing elements. It will further have appeared that the invention fully attains each and all of the objectives hereinabove specifically set forth, as well as the many advantages implied from the description.

Although the invention has been described by making a detailed reference to a presently selected and preferred embodiment, the description is to be understood solely in an instructive, and not in a limiting sense, since many changes may be made within the intended scope and spirit of the claims hereunto appended.

I claim as my invention:

1. In a thresher for grain and the like, and including a separator casing and concave structure, a bar-type separator cylinder assembly, including a shaft, a plurality of wheel-like units mounted in lateral adjacence on the shaft, said units having a plurality of resilient arms projecting radially and transversely of each of said units, the units being assembled on the shaft with the arms of the several units in substantially end-to-end relation, so as collectively to form the bars of the cylinder assembly.

2. A grain separator or the like, including a separator casing and concave structure, a cylinder built up of a plurality of units, a shaft on which the units are mounted, each unit including a hub portion secured to the shaft against rotation relative thereto, each unit further including a pneumatic casing of substantially annular form, carried by the hub portion, the casing being peripherally formed to provide radially and laterally projecting lugs constituting grain-engaging portions adapted to coact with the associated concave structure in the separation of grain, seed or the like.

3. In a separator for grain and the like including a concave, a cooperating cylinder assembly of bar type including a shaft, a plurality of units threaded on the shaft and angularly secured thereto, each of said units being in the general form of a wheel and provided with a plurality of resilient radial lugs, each lug including a peripheral portion in the form of a transverse bar, the units being assembled on the shaft with the peripheral portions of the lugs in end-to-end relation, whereby the lugs coact to constitute a plurality of cylinder separator bars.

4. In a grain separator including a concave and cylinder casing, a bar-type cylinder including a cylinder shaft, a plurality of units mounted in lateral adjacence on the shaft, each unit including a wheel structure, a tire demountably carried by the wheel and formed of a rubber stock, a plurality of lugs of a rubber stock carried by said demountable tire portion, the lugs each being of a width parallel to the axis of the cylinder greater than the small diameter of said tire portion, and the units being assembled so that the lugs are in substantial register, and so coact to form the bars of the cylinder assembly.

5. In a grain separator including a cylinder casing and concave structure, a cylinder assembly of bar type, including a shaft, a plurality of annular units horizontally stacked along and carried by the shaft, the stacked units coacting to constitute the body portion of the cylinder, each such unit including a body formed as a pneumatic tire, a plurality of peripheral lugs on the unit body and formed of the stock of such body, the units being assembled with the lugs in end to end engagement and substantially aligned, and with the body or tire portions thereof substantially spaced from each other.

6. As an article of manufacture, a unit adapted for use in multiple on a cylinder shaft to constitute a built-up separator cylinder for grain or the like, the unit including a metal wheel adapted to be keyed to the shaft, and provided with a peripheral channel, a resilient tire structure carried by the channel portion of the wheel, and a plurality of radially projecting lugs carried by the periphery, and extending parallel to the axis of the tire structure, each said lug being of a length, measured in a direction along the axis of the cylinder, substantially exceeding the small diameter of the tire portion of the unit, and the extremities of each said projection or lug being supported in trussed relation by the casing portion of the unit, the axial trend of the lugs enabling assembly of a plurality of the units on the cylinder shaft with the lugs in abutting, end-to-end relation whereby they coact in forming substantially rectilinear cylinder bar elements extending substantially over the length of the cylinder.

7. A cylinder and casing assembly for a grain separator or the like, including a substantially cylindrical casing provided with longitudinal openings on its opposite sides, respectively adapted for the feeding and discharge of pre-threshed and threshed materials, a rotatable shaft extending through the casing, a cylinder assembly including said shaft and a plurality of units, mounted adjacently along the shaft, each of said units including a resilient body of substantially toroidal form, the bodies of the several units being peripherally formed to provide the cylinder threshing elements thereon, and a plurality of concave bars disposed in a zone of the casing adjacent to but spaced slightly from the bodies of the cylinder-forming units.

8. In a cylinder and concave assembly for a grain separator or the like, a casing of elongate cylindrical form provided with openings on its opposite sides extending substantially the length of the casing and adapted respectively for receiving pre-threshed grain or the like and for the discharge of threshed materials, a cylinder assembly operatively disposed in the casing and including a shaft, a plurality of units threaded on the shaft and secured thereto, each of said units including a portion formed as a resilient wheel and provided with a plurality of radially projecting lugs, each lug including a peripheral portion in the form of a fragmentary transverse bar, the units of the cylinder being assembled on the shaft with the lugs substantially in end-to-end relation, so as collectively to constitute the threshing elements of the cylinder, and a plurality of concave bars carried by the casing and adapted to coact with the lugs of the cylinder in the separation of grain or the like.

9. A cylinder and concave assembly for a grain thresher or the like, including a cylinder casing provided with longitudinal side openings, a shaft operable in the casing, a plurality of units mounted in lateral adjacence on the shaft so as to constitute a built-up separator cylinder, each of such units being of the order of a rubber tired wheel and provided with projecting portions formed of a resilient rubber stock, said projecting portions being of greater width than the wheel-like portion of the associated unit, the units being assembled on the shaft with the lugs in register so that they coact to form cylinder bars, and a plurality of concave bars carried by the casing, each of said concave bars lying in a plane at an acute angle to the cylinder shaft and the projections on said cylinder units.

10. In a cylinder and concave assembly for a grain separator or the like, a cylinder casing provided with oppositely disposed lateral openings for the reception and discharge respectively of pre-threshed and threshed materials, a cylinder operatively disposed in the casing and including a cylinder shaft, a plurality of units mounted in lateral adjacence on the shaft, each said unit consisting of a wheel structure, a tire demountably carried by the wheel and formed of rubber stock, a plurality of lugs formed of a rubber stock and carried by said demountable tire, the lugs being of generally rectangular section and each being of a width, extending along the axis of the cylinder, greater than the small diameter of said tire portion, the units being assembled on the shaft with corresponding lugs in substantially corresponding planes so that the lugs coact to form bars peripherally of the cylinder assembly, and a plurality of concave bars carried by the casing and coacting with the cylinder bars in the threshing process.

11. A cylinder and concave assembly for the general purpose described, including a cylinder casing provided with lateral openings for receiving and discharging pre-threshed and threshed materials respectively, a cylinder of bar type operatively arranged in the casing and including a shaft, a plurality of units horizontally threaded or stacked on the shaft, the stacked units coacting to constitute the body portion of the cylinder, each such unit including a body formed as a pneumatic tire, a plurality of peripheral lugs on the unit body, the units being assembled on the shaft with the tire portions thereof substantially spaced from each other, a plurality of concave bars carried by the inner surface of the casing adjacent the cylinder, and coacting with the bars formed by the lugs of the cylinder units, one of the sets of said bars being arranged out of parallelism with the axes of the cylinder and casing, so that either set of bars is presented to the materials in process at an acute angle to the bars of the other said set.

12. In a thresher for grain and the like, including a separator casing and concave structure, a rotatable cylinder built up of a plurality of axially short, wheel-like units, each of substantially circular section in a plane transverse to the axis of rotation, and means for rotatably mounting the units, the units each including a plurality of resilient, peripherally spaced, plate-like members, substantially aligned in assembly of the units to provide a series of continuous bars forming the threshing elements of the cylinder and extending from end-to-end thereof.

13. In a grain separator including a concave and separator casing, a separator cylinder assembly of bar type, including a rotatable shaft, a plurality of units of generally disc form mounted on the shaft, each of said units being provided with a plurality of substantially planar arms projecting radially and laterally thereof, the peripheral portions of the arms coacting in assembly to constitute cylinder bars, each of the individual arms being of a length, axially of the unit, greater than the width of the unit by which it is carried, whereby the arms of adjacent units abut and serve as spacers for the units in assembly.

14. A grain separator including a separator casing and concave structure, a cylinder built up of a number of similar wheel-like units, a shaft on which said units are threaded, each said unit including a hub portion, an annulus carried by the hub portion and resilient arms carried by and projecting radially and laterally of the annulus, the units being assembled on the shaft with the arms of adjacent units substantially in engagement to form substantially continuous bars constituting the threshing elements of the cylinder.

15. In a grain thresher or the like, having a casing and concave structure, a cylinder assembly comprising a multiplicity of relatively short resilient and deformable beater elements disposed in end to end abutting relation, and means mounting said elements for rotation in unison about an axis extending through the casing and concave structure, some of said elements being supported against endwise movement through the engagement of both ends thereof by adjacent elements.

16. In a grain thresher or the like, having a casing and concave structure, a cylinder assembly comprising a multiplicity of resilient and deformable beaters disposed lengthwise through the structure and yieldable means supporting the beaters for rotative movement about a common axis, each of said beaters being split through its entire radial thickness at a number of points along its length to provide a multiplicty of relatively short beater elements disposed in end to end relation, said supporting means being arranged to individually yieldably support each beater element for limited radial movement.

17. In a grain thresher or the like, having a casing and concave structure, a cylinder assembly comprising a multiplicity of relatively short resilient and deformable beater elements disposed in end to end relation, and support means mounting said elements for rotation in unison about an axis extending through the casing and concave structure, said support means being yieldable to provide limited bodily radial movement for each element.

18. In a grain thresher or the like, having a casing and concave structure, a cylinder assembly comprising a multiplicity of elongated beaters disposed lengthwise through the structure in spaced approximately parallel relation to one another, each beater including relatively short deformable and resilient elements of rubber or the like arranged in end to end relation, and means supporting the beaters for rotation in unison about a common axis extending through the casing, said means having connection with each of the beater elements only at a point or points spaced from the ends of the latter whereby said ends are supported cantilever fashion and are yieldable in a direction toward said axis upon the application of radial pressure thereto.

19. In a thresher for grain and the like, a supporting structure, a concave in the structure to support material during the threshing thereof and having a number of spaced bars, and a cylinder including a plurality of elongated resilient and deformable beaters each in the form of a radial planar member extending a substantial distance longitudinally of the cylinder and a wheel for mounting the beaters to rotate about a common axis and to move in succession across the bars, said wheel having connection with the beaters only along the radially inner edges of the latter whereby the radially outer edges of the beaters are individually yieldable circumferentially of the cylinder by lateral bending of the beaters upon impact with the material being threshed, and each beater being laterally yieldable over a radial depth generally greater than the circumferential thickness thereof.

20. In a thresher for grain and the like, a supporting structure, a concave in the structure for supporting material during threshing thereof, and a cylinder including a multiplicity of resilient and deformable beaters of elongated character and means for supporting the beaters for rotative movement about a common axis and over the concave, each beater comprising a relatively narrow planar member of generally greater radial depth than circumferential thickness and having connection only at its radial inner edge with the supporting means, whereby the member is laterally bendable to yield circumfertially upon impact along its outer edge with material being threshed.

21. In a thresher for grain and the like, a supporting structure, a concave in the structure for supporting material during threshing thereof, and a cylinder including a multiplicity of elongated rubber beaters and means for rotatably supporting the beaters for movement about ι common axis and over the concave, each beater comprising a member disposed in generally parallel relation to the rotational axis of the cylinder and having a laterally unsupported radial depth generally greater than its circumferential thickness, said beaters being secured only along their radial inner edges to the supporting means, whereby the beaters are individually laterally bendable to yield circumferentially upon impact along their outer edges with material being threshed.

22. A rotary beater for grain separators and the like comprising a plurality of elongated, narrow, deformable and resilient elements of rubber or the like, means supporting the elements in approximately parallel spaced relation to one another for rotation about a common axis, each element having a length in the direction of said axis materially greater than the height and the width of the element, and said supporting means having connection with each of the elements only at a point or points spaced from the ends of the latter whereby said ends are supported cantilever fashion and are yieldable toward said axis.

HAROLD MAGINN.